E. W. VOGEL.
ELECTRICALLY OPERATED CONTROLLING APPARATUS.
APPLICATION FILED JULY 8, 1914.
1,299,638.
Patented Apr. 8, 1919.
3 SHEETS—SHEET 1.
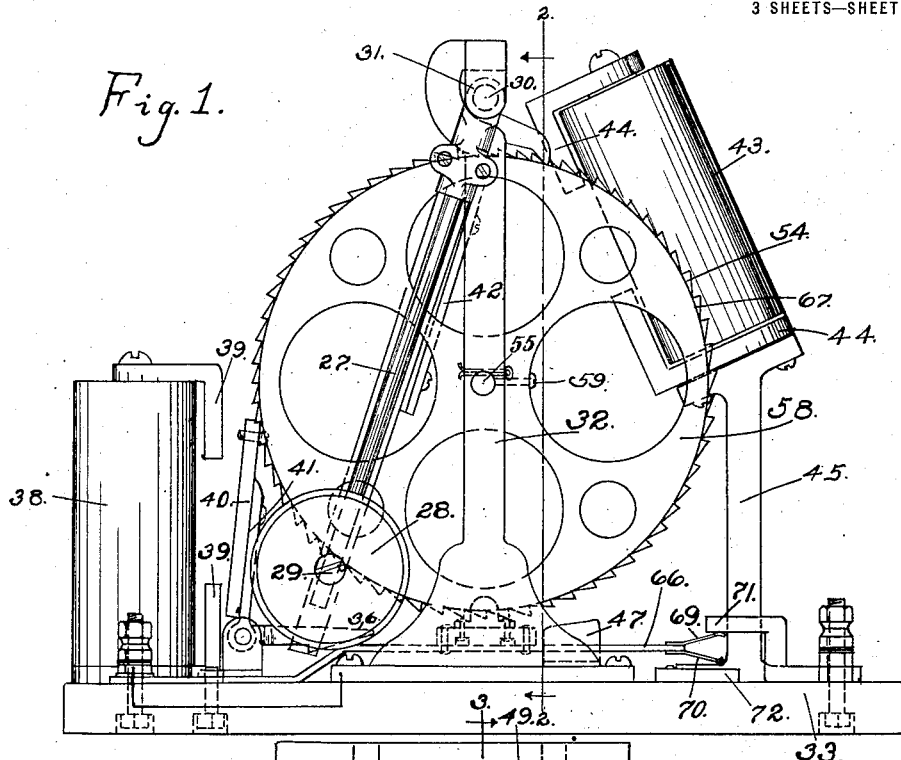
Fig. 1.
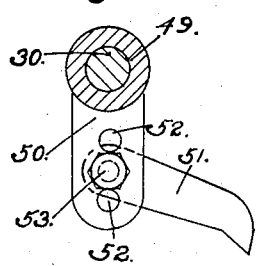
Fig. 2.
Fig. 3.
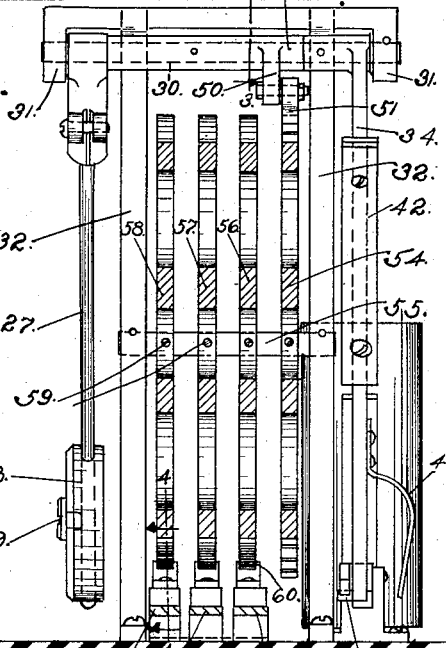
Fig. 4.
WITNESSES:
INVENTOR.
Eugene W. Vogel
by Barnett & Truman
ATTORNEYS E. W. VOGEL.
ELECTRICALLY OPERATED CONTROLLING APPARATUS.
APPLICATION FILED JULY 8, 1914.
1,299,638.
Patented Apr. 8, 1919.
3 SHEETS—SHEET 2.
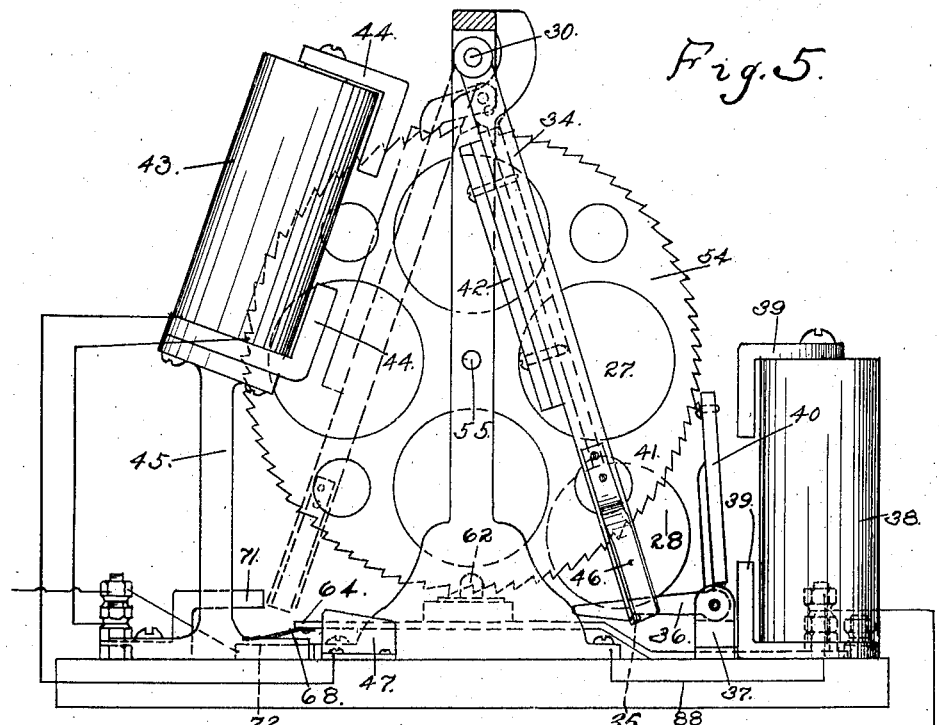

E. W. VOGEL.
ELECTRICALLY OPERATED CONTROLLING APPARATUS.
APPLICATION FILED JULY 8, 1914.
1,299,638.
Patented Apr. 8, 1919.
3 SHEETS—SHEET 3.
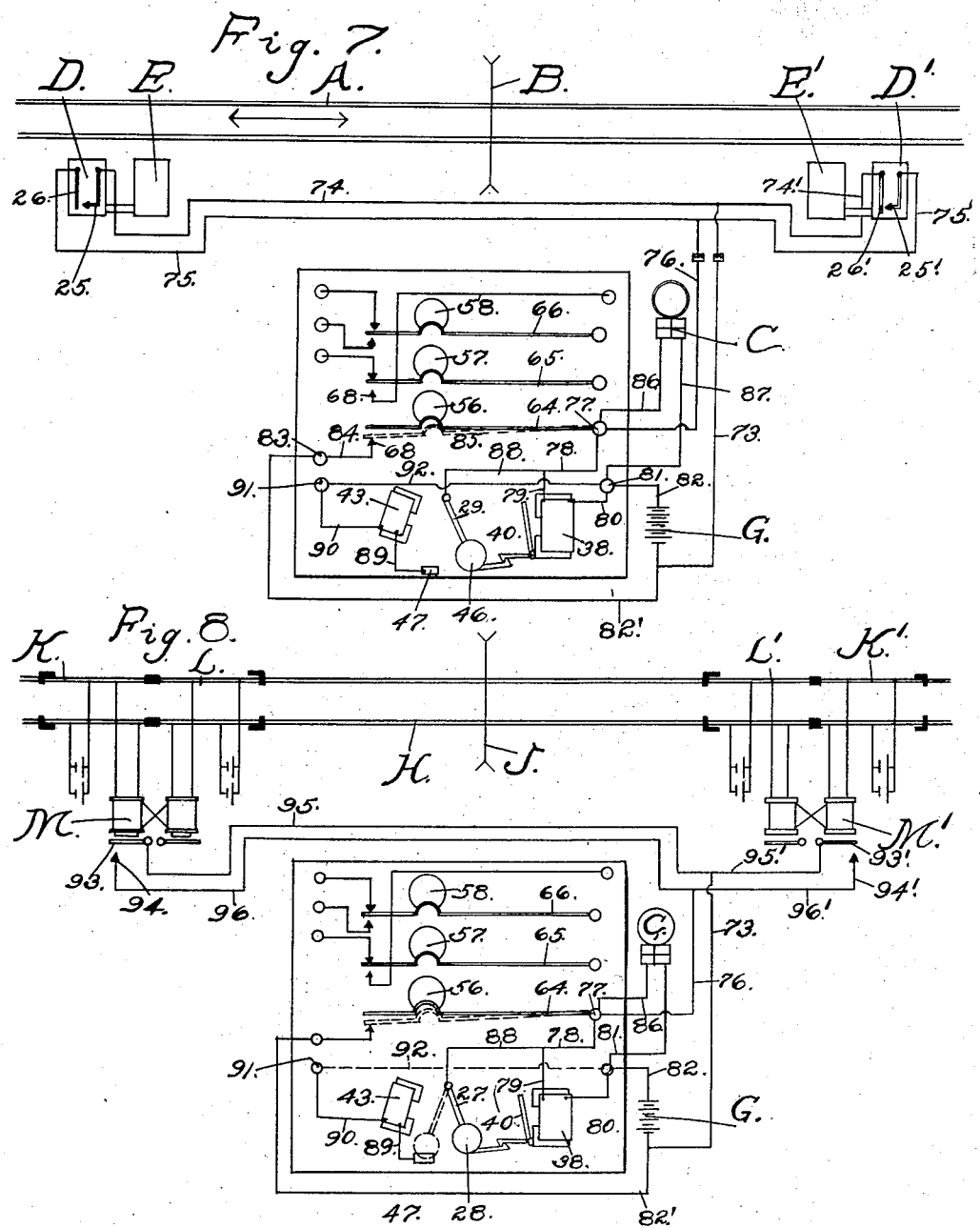

UNITED STATES PATENT OFFICE.

EUGENE W. VOGEL, OF OAK PARK, ILLINOIS, ASSIGNOR TO CHICAGO RAILWAY SIGNAL AND SUPPLY COMPANY, OF CARPENTERSVILLE, ILLINOIS, A CORPORATION OF ILLINOIS.

ELECTRICALLY-OPERATED CONTROLLING APPARATUS.

1,299,638.    Specification of Letters Patent.    Patented Apr. 8, 1919.

Application filed July 8, 1914.   Serial No. 849,743.

*To all whom it may concern:*

Be it known that I, EUGENE W. VOGEL, a citizen of the United States, residing at Oak Park, in the county of Cook and State of Illinois, have invented certain new and useful Improvements in Electrically-Operated Controlling Apparatus, of which the following is a specification.

My invention relates to apparatus for controlling the operation of an instrument or mechanism, and particularly to a controlling apparatus which, upon actuation, sets in operation the controlled instrument or mechanism and after a determinate interval automatically stops the operation of the same. The invention has in view more specifically a controlling apparatus suitable for governing the operation of an instrument employed in railway signaling service, for example, a highway bell or similar alarm device; but it might be utilized in other situations and in connection with other mechanisms where similar conditions are met with.

One of the principal objects of the invention is to provide an apparatus of this sort which may be operated wholly by electricity, which will be inexpensive to manufacture, and strong, light and durable in construction, and which will not readily get out of order.

A further object of the invention is to provide a controlling mechanism of this sort which can be easily adjusted so as to vary the time interval.

The invention consists in the novel constructions, arrangements and devices, to be hereinafter described and claimed, for carrying out the above objects and such other objects as will appear from the following description.

The invention is illustrated, in a preferred embodiment, in the accompanying drawings wherein—

Figure 1 is a side elevation of the apparatus;

Fig. 2, a sectional view taken on line 2—2 of Fig. 1;

Figs. 3 and 4, detail sectional views taken on lines 3—3 and 4—4 of Fig. 2;

Fig. 5, an elevation of the opposite side of the apparatus from that shown in Fig. 1;

Fig. 6, a plan view of the apparatus with certain parts removed for the purpose of showing more clearly the electrical constructions thereof;

Fig. 7, a diagram showing the application of the controlling apparatus of my invention to the operation of a signaling bell, this installation showing the apparatus as actuated by the deflection of the rails under the weight of passing trains, and Fig. 8, a similar diagram to illustrate the actuation of the device by means of track circuits.

Like characters of reference designate like parts in the several figures of the drawings.

Referring first to Fig. 7, A designates a railroad track over which the traffic passes in opposite directions, B a highway, and C an alarm or highway signaling bell which is set ringing as the train approaches the highway B. Ordinary highway bells ring continuously from the time a train comes on the block which the highway crosses until it leaves said block, or at least until it crosses the highway. If a train stays for any length of time on the block, for example, a freight train in switching, the continuous ringing of the highway bell is an annoyance besides lessening its efficiency as a warning signal. My invention provides an apparatus which sets the bell ringing when the train reaches a point at a certain distance from the highway and after a determinate interval silences the bell regardless of whether the train has crossed the highway or not.

If a train approaches the highway from the left it sets the bell controlling apparatus in operation by actuating a track instrument D. A train approaching the highway from the right actuates, to similar effect, a track instrument D'. The track instruments D, D' are furnished with interference devices E, E' which operate, in each case, to prevent the functioning of the track instruments with which they are respectively associated on the approach of trains toward said instruments in the direction from the highway. The construction of the instruments D, D', E, E' in an arrangement exactly the same as shown in Fig. 7, is described in my co-pending application Serial No. 847,291 filed June 25, 1914, and patented July 4, 1916, No. 1,189,316, so that a detailed description of the same in this application will be unnecessary. It will suffice to say that the instruments D, D' are furnished with pairs of circuit closing contacts 25, 26 and 25', 26' respectively, which are brought together when one of the rails of the track A is deflected by trains moving past the instrument in the direction toward the highway.

The apparatus constituting my present invention which operates, when its circuit is closed at 25, 26 or 25′, 26′, to set the bell ringing and, after a determinate period, to silence the same, is preferably constructed as follows:

27 is a pendulum the bob 28 of which is adjustable lengthwise of the pendulum by means of a set screw 29. The pendulum is fixed to a rocking shaft 30 mounted in bearings 31 in a framework 32 preferably supported on an insulating base 33. Fixed to the other end of shaft 30, and consituting in effect part of the pendulum, is an arm 34 provided at its lower end with a catch 35 adapted to be engaged by an angular trip 36 pivotally mounted in a clevis 37 on the base 33. 38 is an electro-magnet having pole pieces 39 and an armature 40 which latter is secured to the up-standing arm 41 of the trip 36. Attached to the arm 34 is the armature 42 of a magnet 43 provided with angular pole pieces 44 and mounted in a diagonal position on a standard 45. The arm 34 carries at its lower end a spring contact 46 adapted on the forward stroke of the pendulum, that is, when it moves toward magnet 43, to make a wiping contact with a stationary contact device 47 on the base. In passing contact 47 on the return stroke the contact spring is held away from contact 47 by a guiding cam 48. In Fig. 6 one dotted figure shows the position of the contact spring 46 just before it engages contact 47, and the other dotted figure in position when about to engage the guiding cam 48 on the return stroke. The engagement of contacts 46, 47 momentarily energizes magnet 43, the attractive force of which on the pendulum supplements the action of gravity so as to keep the pendulum in oscillation.

Fixed to the rocking shaft 30 is a sleeve 49 formed with an arm 50 to which is pivoted a pawl 51, the arm being formed with several perforations 52 for the pivot pin 53 of the pawl, so that the position of the pawl is capable of adjustment. The pawl operates on a ratchet wheel 54 fixed to a shaft 55 revolubly mounted in the frame 32. One or more cam wheels are secured to the same shaft 55. I have shown three such cam wheels designated 56, 57, 58. These devices, and preferably also the ratchet wheel 54 are fixed to the shaft 55 by set screws 59 so that their relative positions on the shaft 55 may be varied. Each cam wheel is formed with a notch or cam groove 60 (Fig. 4) into which fits a rounded projection 61 on a steel plate 62 carried by an insulating block 63 on a contact spring secured to the base 33 below each of said cam wheels. The spring below cam wheel 56 is designated 64 and those below wheels 57, 58 are designated 65, 66, respectively. When the cam wheel 56 is rotated by the oscillation of the pendulum, the projection 61 is forced out of the cam groove 60 and bears upon the smooth perimeter 67 of the wheel. This forces the end of the contact spring against a fixed contact 68 closing the circuit of bell C and a circuit through magnet 38 and bridging the track devices D, D′.

The contact springs 65, 66 are preferably provided, in each case, with double terminal members 69, 70. The upper member 69, in each case, is adapted to bear against an overhanging contact 71 when the spring is in its upper position. When the spring is forced down by the cam wheel the lower member 70 thereof bears against a lower fixed contact 72. The circuit making and breaking means provided by the springs 65, 66 and their associated parts, may be employed for the energization and deënergization of any suitable electrically operated mechanisms, the timing of which, with respect to the bell ringing apparatus which is controlled by contact spring 64 and with respect to each other, may be adjusted by an appropriate adjustment of the cam wheels 57, 58 on shaft 55. I have not shown any such mechanisms as the use and operation of the invention will be fully understood from the description of the operation of the bell ringing mechanism which is effected through the instrumentality of the contact spring 64.

The operation of the controlling apparatus above described, when employed for controlling the bell ringing mechanism C in the installation shown in Fig. 7, is as follows:

Assuming that a train is moving from left to right on track A when it reaches the track instrument D the contact 26 is brought against contact 25 closing a circuit through magnet 38 and battery G as follows: Wires 73, 74, contacts 25, 26, wires 75, 76, binding post 77, wires 78, 79, magnet 38, wire 80, binding post 81 and wire 82. Magnet 38 is energized and attracts its armature 40 thereby releasing the pendulum which swings toward magnet 43.

The first forward stroke of the pendulum causes pawl 51 to engage ratchet wheel 54 turning the same so as to force the projection 61 out of the notch 60 in the cam wheel 56. This brings contact spring 64 against contact 68 closing a circuit through the bell ringing mechanism C as follows: Wire 82′, binding post 83, wire 84, stationary contact 68, contact spring 64, binding post 77, wire 86, the bell ringing mechanism C, wire 87, binding post 81 and wire 82.

Inasmuch as contacts 25, 26 of the track instrument remain together for a relatively short period, depending upon the length of the train and the speed at which it is running, it is necessary to provide a circuit for the magnet 38 which will be independent of contacts 25, 26 and subject to control by the timing mechanism. Such circuit is provided when contact spring 64 is brought against the stationary contact 68 and is as follows: from the battery through the contact spring 64 to binding post 77 as just described, to the magnet through wires 78, 79, from the magnet back to the battery through wire 80, binding post 81 and wire 82; the connection through the contact spring 64 bridging the contacts 25, 26. When the contact spring wipes along contact 47 on its forward stroke toward magnet 43 it closes a circuit through the magnet 43 as follows: to binding post 77 through contact spring 64 as above described, wire 78, wire 88 to the frame 32, arm 34 and contact spring 46, stationary contact 47, wire 89, magnet 43, wire 90, binding post 91, wire 92, binding post 81 and wire 82. This momentarily energizes the magnet 43 which attracts its armature 42 on the arm 34 and imparts a forward impulse to the pendulum which ceases as soon as contacts 46, 47 separate. On the return stroke the contact spring moves along the guiding cam 48 and by this means is kept away from the stationary contact 47.

This operation is repeated until the notch 60 on the cam wheel 56 has made one complete revolution, whereupon the projection 61 on contact spring 64 slips into the notch 60 in the cam wheel and the contact spring 64 separates from the contact 68. This breaks the circuit through the bell C which stops ringing. It also breaks the circuit through the magnet 38 with the result that the trip 36 drops and on the next return stroke of the pendulum engages the arm 34 holding the pendulum in stationary position.

The period required for one complete revolution of the ratchet wheel 54 and of the cam wheel 56, which determines the length of time that the bell rings after being set in operation, may be varied by attaching the pawl 51 to arm 50 at different points, the arm being provided for this purpose with a plurality of perforations 52. A closer adjustment may be made by moving the bob 28 up and down on the pendulum.

A train moving in the opposite direction on track A, that is, from right to left, on passing the track instrument D' operates the apparatus in exactly the same manner, the contacts 25', 26' being connected with wires 76 and 73 respectively, by wires 75', 74'.

Fig. 8 shows the apparatus as actuated from track circuits instead of by means of the rail deflection instruments D, D' of the other installation. Portions of the track H, at suitable distances on opposite sides of the highway J, are insulated so as to provide blocks K, L, K', L', for the control of the interlocking relays M, M'. The presence of a train moving toward the highway on the block K or the block K' causes the relay M or M' to drop its armature, closing the circuit at 93, 94 or 93', 94'. The contacts 93 or 93' are connected with the wire 73 by wires 95, 95'. Wires 96, 96' connect the contacts 94, 94' with wire 76. In other respects the installation is exactly the same as that shown in Fig. 7.

While I have described my invention in certain preferred embodiments, modifications might be made without departure from the principles of the invention. Therefore I do not wish to be understood as limiting the invention to the precise constructions, arrangements and devices shown and described except so far as said constructions, arrangements and devices are specifically made limitations in certain of the claims herein.

I claim:

1. In controlling device, the combination with a pendulum, of a retaining device for the same, a magnet which when energized causes said retaining device to release the pendulum, means for momentarily closing a circuit through said magnet to initially energize the same, a circuit making and breaking element adapted to close a second circuit through said magnet, means for holding said second circuit closed for a predetermined period comprising mechanism operated by the movement of said pendulum to move said element in one direction when the pendulum is released and permits its movement in the opposite direction at the expiration of said predetermined period; and a magnet intermittently energized and adapted to momentarily attract said pendulum.

2. In controlling device, the combination with a pendulum, of a retaining device for the same, a magnet which when energized causes said retaining device to release the pendulum, means for momentarily closing a circuit through said magnet to initially energize the same, a circuit making and breaking element adapted to close a second circuit through said magnet, means for holding said second circuit closed for a predetermined period comprising a cam wheel which bears against the circuit making and breaking element to close said second circuit, a ratchet wheel connected with said cam wheel, a pawl providing an adjustable connection between the pendulum and ratchet wheel whereby the amount of angular movement of the ratchet wheel for each stroke of the pendulum may be varied, and a magnet intermittently energized to keep said pendulum in oscillation.

3. In controlling device, the combination with a pendulum, of a retaining device for the same, a magnet which when energized causes said retaining device to release the pendulum, means for momentarily closing a circuit through said magnet to initially energize the same, a circuit making and breaking element adapted to close a second circuit through said magnet, means for holding said second circuit closed for a predetermined period comprising a cam wheel which bears against the circuit making and breaking element to close said second circuit, a ratchet wheel connected with said cam wheel, a pawl providing an adjustable connection between the pendulum and ratchet wheel whereby the amount of angular movement of the ratchet wheel for each stroke of the pendulum may be varied, a magnet intermittently energized to keep said pendulum in oscillation, and a third circuit closed by the movement of the pendulum for energizing said last named magnet.

EUGENE W. VOGEL.

Witnesses:
L. A. FALKENBERG,
G. Y. SKINNER.